A. R. WILFLEY.
CENTRIFUGAL PUMP.
APPLICATION FILED JUNE 13, 1919.
1,346,924.
Patented July 20, 1920.
2 SHEETS—SHEET 1.
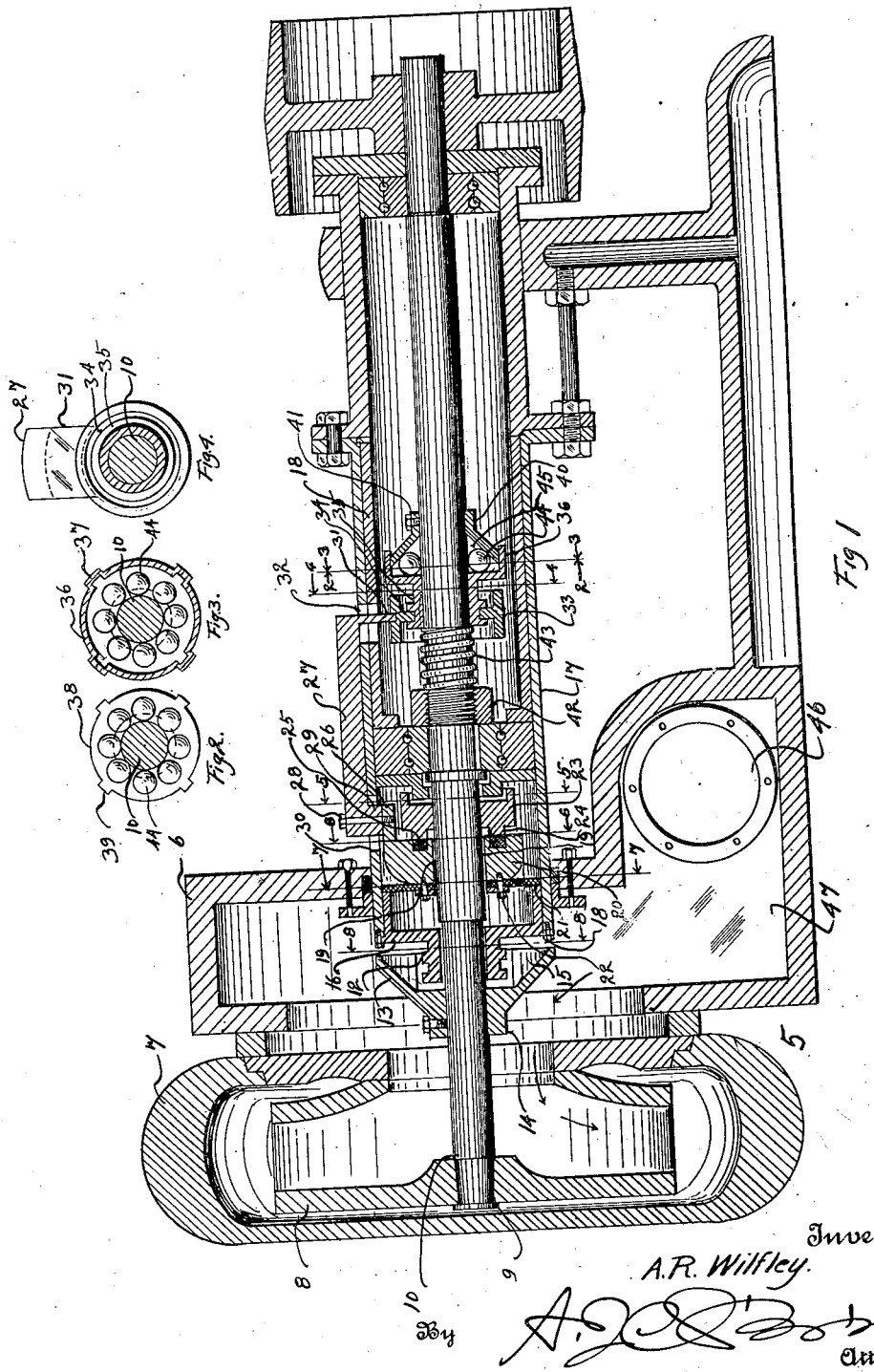
Inventor
A.R. Wilfley.

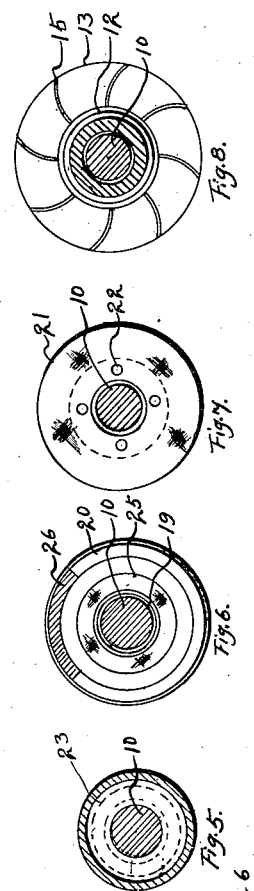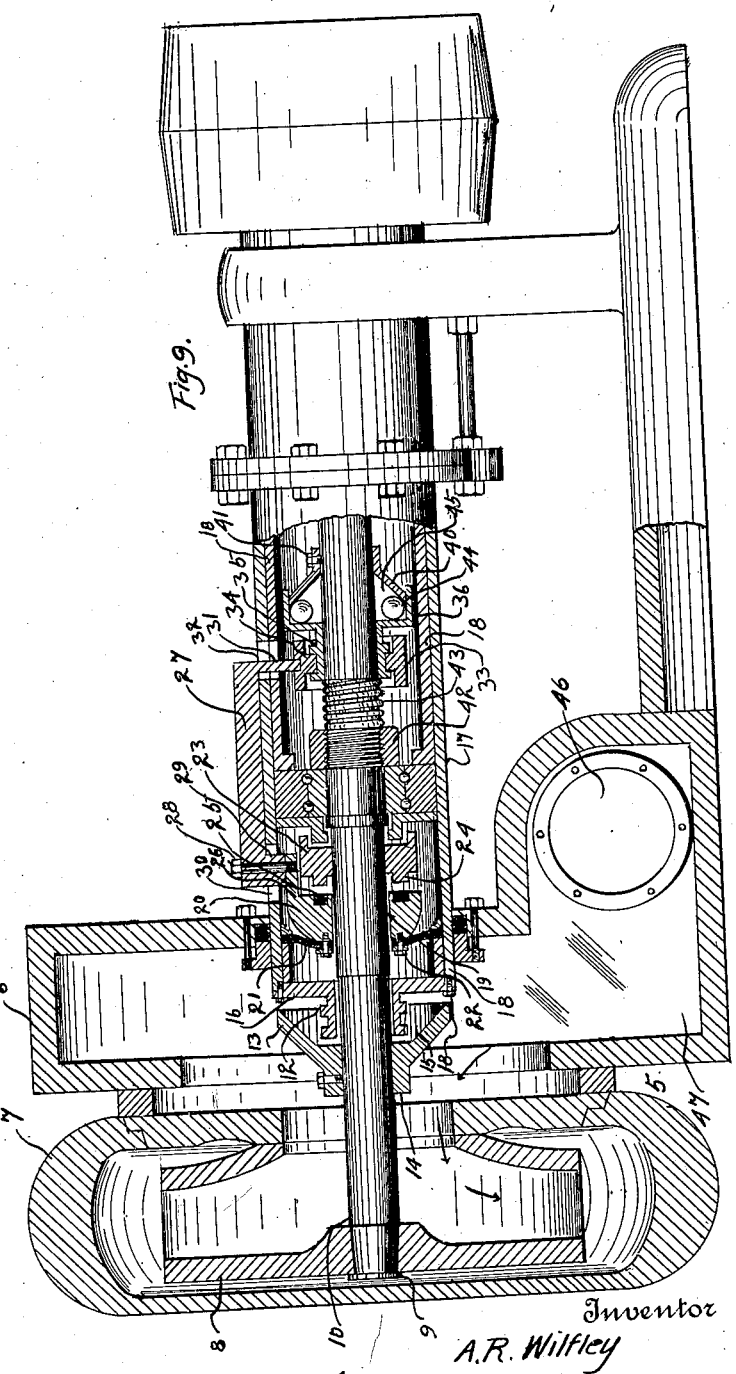

UNITED STATES PATENT OFFICE.

ARTHUR R. WILFLEY, OF DENVER, COLORADO.

CENTRIFUGAL PUMP.

1,346,924.

Specification of Letters Patent.

Patented July 20, 1920.

Application filed June 13, 1919. Serial No. 303,891.

*To all whom it may concern:*

Be it known that I, ARTHUR R. WILFLEY, a citizen of the United States, residing at the city and county of Denver and State of Colorado, have invented certain new and useful Improvements in Centrifugal Pumps; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in centrifugal pumps, my object being to provide a construction in which the runner shaft is not directly engaged with the portion of the pump casing through which it passes and wherein provision is made for keeping the opening around the shaft and which forms communication between the runner chamber and the atmosphere, free from liquid when the pump is in operation, provision also being made for sealing this opening when the pump is inactive, in order to prevent any liquid which may be above the pump casing, as in a stand pipe, for instance, from leaking out through the said opening around the shaft. The object of maintaining an opening around the shaft, and whereby the shaft is free from bearing contact in the pump casing during the operation of the pump, is to prevent the wear incident to such bearing contact, and which is particularly great in pumps of ordinary construction, where these pumps are handling liquid which is mixed with ore or sand, or other material which wears out joints very rapidly, where the parts of the joints are in contact during the operation of the pump.

In my present invention, I mount a member on the shaft, which member rotates with the shaft and is provided with a recess in communication with the said opening around the shaft, the said member being so constructed that it keeps the said recess free from liquid, as well as the opening around the shaft, when the pump is in operation, due to the centrifugal force generated or produced by said member. Furthermore, the means of sealing the opening around the shaft when the pump is inactive consists of two parts, one of which is fast on the shaft while the other is carried by a flexible diaphragm, supported by the casing, which last named part of the joint is shiftable in the direction of the axis of the shaft for the purpose of opening and closing said joint, one movement, namely the movement for opening the joint, being accomplished through the medium of a centrifugally-operated governor, while the other movement, or that for closing the joint, is imparted through the instrumentality of a spring.

Having briefly outlined my improvement, I will proceed to describe the same in detail, reference being made to the accompanying drawing, in which is illustrated an embodiment thereof. In this drawing:

Figure 1 is a vertical, longitudinal section taken through the pump.

Fig. 2 is a view of one member of the centrifugal governor, viewed in the direction of arrows 2, Fig. 1.

Fig. 3 is a view of this same member and its coöperating member, looking in the direction of arrows 3, Fig. 1, one of the members being shown in section, taken on the line 3—3, Fig. 1.

Fig. 4 is a section taken through one of the governor members on the line 4—4, Fig. 1, looking in the direction of arrows 4.

Fig. 5 is a view of one member of the sealable joint, looking in the direction of arrows 5, Fig. 1.

Fig. 6 is a view of the other member of the joint, looking in the direction of arrows 6, Fig. 1.

Fig. 7 is a view of the flexible diaphragm, looking in the direction of arrows 7, Fig. 1.

Fig. 8 is a section taken on the line 8—8, Fig. 1, looking toward the left.

Fig. 9 is a view similar to Fig. 1, but showing the sealable joint open and the other parts in their corresponding positions.

The same reference characters indicate the same parts in all the views.

Let the numeral 5 designate a stationary casing, upon which is mounted an air chamber 6, which is connected with the main casing 7, in which the runner 8 is arranged. The runner 8 is connected, as shown at 9, with one extremity of the shaft 10, this shaft extending through an opening in the casing, which is in communication with a recess 13, formed centrally in a member 14 fast on the shaft and provided with fan blades 15, the portion of the member 14 which is provided with these blades extending outwardly from the shaft and surrounding the recess 13. The casing is provided with a part 16, stationary therewith and with which a part 12, through which the shaft passes, is integral, the part 12 extending into the recess 13 of the member 14. The part 16 is connected with an outer sleeve 17, by means of suitable fastening devices, 18. The shaft also passes through an opening 19, in a part 20 of a sealable joint, this part 20 being mounted on a flexible diaphragm 21, carried by the casing, the joint part being connected with the diaphragm by means of suitable fastening devices 22. The other part 23 of the sealable joint is fast on the shaft and is provided with a circular rib 24, which coöperates with a packing ring 25, set into a groove formed in the adjacent face of the joint part 20. The part 20 has a rearward projection 26, which is connected with an arm 27, by means of a bolt 28, the arm having a forward projection 29, extending through a slot 30 in the sleeve 17. The rear extremity of the arm 27 also has a projection 31, which passes through an opening 32, formed in the sleeve 17 and in a bushing 18. The inner extremity of the projection 31 enters a recess formed in a collar 33, which has an interiorly projecting rib 34, which enters a circumferential groove formed in the sleeve 35 of a member 36, forming a part of the centrifugal governor and interlocked by means of grooved portions 37 with the other member 38 of the centrifugal governor, which is provided with coöperating tongues 39. The governor part 36 is loose on the shaft, but rotates therewith by virtue of its interlocking connection with the other governor member 40, which is secured to the shaft as shown at 41.

Between the forward extremity of the sleeve 35 of the governor member 36, and a nut 42 threaded on the shaft, is a spiral spring 43, which normally acts through the medium of the said governor member, the collar 33 and the arm 27 to maintain the part 20 of the sealable joint in sealing relation with its coöperating part 23, which is the condition when the pump is inactive. As soon, however, as the pump starts and the shaft 10 and parts mounted thereon begin to rotate, balls 44, which are loosely mounted in a cavity 45, formed by the governor parts 36 and 40, are thrown outwardly by centrifugal force and as the part 40 is fast on the shaft, the outward movement of the balls due to centrifugal force, results in forcing the governor member 36 forwardly, whereby a corresponding movement is imparted to the collar 36, which in turn carries the arm 27 forwardly and imparts a corresponding movement to the part 20 of the sealable joint, thus opening the inside joint, the parts being then in the position illustrated in Fig. 9. During this time the liquid, through a suitable inlet 46, enters a sump or chamber 47, and passes thence into the runner chamber, as indicated by the arrows. In this event, the recess 13 which communicates with the opening around the shaft is open to the liquid, but is kept free therefrom by the centrifugal force developed by the member 14, which serves to keep the liquid out of this recess when the pump is in operation and consequently serves to prevent the liquid from entering the opening around the shaft, and also prevents it from escaping to the atmosphere though the sealable joint is open, as shown in Fig. 9. Hence, while the shaft is free from bearing contact where it passes through the casing, this portion of the shaft is also free from contact with the material handled by the pump. Now, as soon as the pump ceases to operate and the shaft and runner stop, the balls 44 are no longer held in their outward position by centrifugal force, and the recoil of the spiral spring 43 serves to move the governor member 36 rearwardly, whereby the arm 27 is shifted in the same direction and the part 20 of the sealable joint moved to the sealing position, thus preventing the escape of liquid when the pump is inactive, through the opening around the shaft.

The subject matter disclosed in this application consisting of a centrifugal pump whose casing is provided with an unsealed opening through which the runner shaft passes, and a member mounted to rotate with the shaft adjacent to said opening, and so constructed as to keep the opening free from liquid by centrifugal force, is broadly claimed in my simultaneously pending application, Serial No. 254,029, filed Sept. 14, 1918, and consequently is not so claimed in this application.

Having thus described my invention, what I claim is:

1. A centrifugal pump whose casing is provided with an opening through which the runner shaft passes, said opening being in communication with the runner chamber, and two coöperating members spaced from the runner in the direction of the shaft, and mounted adjacent said opening, one member being connected to rotate with the shaft and having a bladed cavity in communication with said opening, the other member being non-rotatable and having a face in close proximity to the bladed cavity of the rotary member.

2. A centrifugal pump whose casing is provided with an opening through which the runner shaft passes, said opening being in communication with the runner chamber, and two coöperating members spaced from the runner in the direction of the shaft and mounted adjacent said opening, one member being connected to rotate with the shaft and having blades arranged to throw the liquid outwardly from the shaft by centrifugal force, said member having a cavity in communication with said opening and the other member having a part projecting into said cavity.

3. A centrifugal pump whose casing is provided with an opening through which the runner shaft passes, said opening being in communication with the runner chamber and two coöperating members spaced from the runner in the direction of its shaft and mounted adjacent said opening, one member being connected to rotate with the shaft and having a cavity in communication with said opening, the outer portion of said cavity being bladed to throw liquid outwardly from the shaft by centrifugal force, and the other member being non-rotatable and having a part projecting into the central portion of said cavity.

4. A centrifugal pump whose casing is provided with an opening through which the runner shaft passes, said opening being in communication with the runner chamber and two coöperating members spaced from the runner in the direction of its shaft and mounted adjacent said opening, one member being connected to rotate with the shaft and having a cavity in communication with said opening, the outer portion of said cavity being bladed to throw liquid outwardly from the shaft by centrifugal force, and the other member being non-rotatable and having a part projecting into the central portion of said cavity, and an outer face in close proximity to the bladed portion of said cavity.

5. A centrifugal pump whose casing is provided with an opening through which the runner shaft passes, said opening being in communication with the runner chamber, two coöperating members spaced from the runner in the direction of its shaft and mounted adjacent said opening, one member being connected to rotate with the shaft and having a bladed cavity in communication with said opening, the other member being non-rotatable and having a face in close proximity to the bladed cavity of the rotary member, and a sealable joint to prevent the escape of liquid through said opening when the pump is inactive.

6. A centrifugal pump whose casing is provided with an opening through which a runner shaft passes, said opening being in communication with the runner chamber, two coöperating members spaced from the runner in the direction of its shaft and mounted adjacent said opening, one member being connected to rotate with the shaft and having a bladed cavity in communication with said opening, the other member being non-rotatable and having a face in close proximity to the bladed cavity of the rotary member, a sealable joint between said cavity and the atmosphere, and means for automatically opening and closing said joint.

7. A centrifugal pump whose casing is provided with an opening through which the runner shaft passes, said opening being in communication with the runner chamber, two coöperating members spaced from the runner in the direction of its shaft and mounted adjacent said opening, one member being connected to rotate with the shaft and having a bladed cavity in communication with said opening, the other member being non-rotatable and having a face in close proximity to the bladed cavity of the rotary member, and a sealable joint between said cavity and the atmosphere, one part of the cavity and the atmosphere, one part of the joint being mounted on the shaft and the other part being shiftable in the direction of the axis of the shaft to open and close said joint.

8. A centrifugal pump whose casing is provided with an opening through which the runner shaft passes, said opening being in communication with the runner chamber, two coöperating members spaced from the runner in the direction of its shaft and mounted adjacent said opening, one member being connected to rotate with the shaft and having a bladed cavity in communication with said opening, the other member being non-rotatable and having a face in close proximity to the bladed cavity of the rotary member, a sealable joint between said cavity and the atmosphere, one part of the joint being mounted on the shaft, and a flexible diaphragm upon which the other part of the joint is mounted, whereby the said last-named joint part is movable in the direction of the axis of the shaft.

9. A centrifugal pump whose casing is provided with an opening through which the runner shaft passes, said opening being in communication with the runner chamber, two coöperating members spaced from the runner in the direction of its shaft and mounted adjacent said opening, one member being connected to rotate with the shaft and having a bladed cavity in communication with said opening, the other member being non-rotatable and having a face in close proximity to the bladed cavity of the rotary member, a sealable joint between said cavity and the atmosphere, one part of the joint being mounted on the shaft, and a flexible diaphragm upon which the other part of the joint is mounted, whereby the said last-named joint part is movable in the direction of the axis of the shaft, and means for automatically imparting said movement.

10. A centrifugal pump whose casing is provided with an opening through which the runner shaft passes, said opening being in communication with the runner chamber, two coöperating members spaced from the runner in the direction of its shaft and mounted adjacent said opening, one member being connected to rotate with the shaft and having a bladed cavity in communication with said opening, the other member being non-rotatable and having a face in close proximity to the bladed cavity of the rotary member, a sealable joint between said cavity and the atmosphere, one part of the joint being mounted on the shaft, and a flexible diaphragm upon which the other part of the joint is mounted, whereby the said last-named joint part is movable in the direction of the axis of the shaft, and a centrifugally operated governor for imparting said movement.

In testimony whereof I affix my signature.

ARTHUR R. WILFLEY.